US006284679B1

(12) United States Patent
Schilling et al.

(10) Patent No.: US 6,284,679 B1
(45) Date of Patent: Sep. 4, 2001

(54) METHOD TO PRODUCE A FABRIC STRIP, ESPECIALLY FOR A SCREEN PRINTING FORM, AND FABRIC, ESPECIALLY SCREEN PRINTING FABRIC

(75) Inventors: Christian Schilling, Seuzach; Hugo Gmür, Rorschacherberg; Martin Lehner, Engelburg, all of (CH)

(73) Assignee: Sefar AG (CH)

( * ) Notice: Subject to any disclaimer, the term of this patent is extended or adjusted under 35 U.S.C. 154(b) by 0 days.

(21) Appl. No.: 09/254,835

(22) PCT Filed: Sep. 6, 1997

(86) PCT No.: PCT/EP97/04844

§ 371 Date: Mar. 12, 1999

§ 102(e) Date: Mar. 12, 1999

(87) PCT Pub. No.: WO98/10940

PCT Pub. Date: Mar. 19, 1998

(30) Foreign Application Priority Data

Sep. 13, 1996 (DE) .............................................. 196 37 267

(51) Int. Cl.[7] ............................ D03D 15/00; B32B 5/02; B32B 15/14; C25D 7/00; C25D 5/54

(52) U.S. Cl. .......................... 442/230; 442/131; 442/232; 205/150; 205/159; 205/165; 174/35 MS

(58) Field of Search .................................... 205/150, 159, 205/165; 174/35 MS; 442/131, 230, 232

(56) References Cited

U.S. PATENT DOCUMENTS 4,042,466 8/1977 Anselrode .............................. 204/11

FOREIGN PATENT DOCUMENTS

95/17534 * 6/1995 (WO) .
9517534 6/1995 (WO) .

* cited by examiner

*Primary Examiner*—Edna Wong
(74) *Attorney, Agent, or Firm*—Bachman & LaPointe, P.C.

(57) ABSTRACT

A cloth web is prepared by providing a plastic cloth with a metallic casing layer on both sides thereof by vapor deposition, plasma spraying or cathode sputtering, and then galvanically coating the resultant material with a metal coating.

20 Claims, 1 Drawing Sheet

METHOD TO PRODUCE A FABRIC STRIP, ESPECIALLY FOR A SCREEN PRINTING FORM, AND FABRIC, ESPECIALLY SCREEN PRINTING FABRIC

This is a national stage application of PCT/EP97/104844 filed Sep. 6, 1997.

The invention concerns a process for the production of a cloth web, in particular for use as a screen printing form comprising a non-metallic cloth which is provided with a casing layer and then galvanically coated with a metal coating. The invention also concerns a cloth comprising mutually crossing strands, in particular a screen printing cloth produced by that process.

Centuries after it was first used in China the screen printing process has been known in Europe approximately since the 19th Century; a fine-mesh textile cloth or wire mesh material is stretched out in a screen printing frame and covered at the image-free regions so as to be impermeable to ink. Besides manual cut stencils—for example for labelling or writing—nowadays preferably photographically produced direct or indirect stencils are the usual practice; the choice of the kind of stencil adopted—in the case of direct stencils those with emulsion, with direct film and emulsion or with direct film and water—is left to the discretion of the screen printer.

A plurality of steps are usually required to produce a screen printing form. Firstly a screen printing cloth is stretched out over a clamping frame of light metal or alloy, wood or the like, and is glued to the frame in its stretched position. Cleaning of the cloth permits the subsequent application of a photosensitive emulsion, for example using a coating channel manually or by machine with an automatic coating apparatus. As the coating thereon cannot be produced exactly as far as the inward side of the frame, the remaining surface area must be subsequently sealed off using screen filler. The coated surface is now exposed by means of a copy original (film) corresponding to the print image. The regions of the print image which are not exposed are washed out. After the operation of drying the stencil, a retouching operation is effected, and the edges are covered over with screen filler.

For certain areas of use, it is known, when dealing with plastic meshes, to settle palladium nuclei or seeds on the surface by a chemical treatment of the surface, and to metallise the filaments. Those chemical treatment procedures involve a plurality of stages and are to be matched in terms of their compositions and operating procedures to the respective plastic material involved. Limitations in regard to the choice of material are predetermined on the basis of poor or unsuitable materials. The known expensive preliminary treatments can be followed by expensive chemical metal deposition processes; because of its inadequate conductivity, the pre-treated plastic cloth surface cannot be directly covered with a galvanic metal deposit.

U.S. Pat. No. 1,934,643 dating from the year 1930 describes a cloth of electrically conductive material, the surface of which is provided with a non-metallic cover layer or a cover layer of pure metal or an alloy, in particular with nickel or chromium, using spraying, plating or a chemical or galvanic process.

U.S. Pat. No. 4,042,466 discloses a process for the production of a cloth web which is produced for use as a screen printing stencil from a textile cloth, the cloth web being provided with a metallic cover layer. For that purpose the plastic yarns are coated with a thin metal layer of for example copper of a layer of 1 to 2 μm as a conductive intermediate layer and a nickel layer of 25 μm is applied thereto by galvanization.

Finally DE 32 43 190 A1 is concerned with a continuous process for the production of metallized textile flat structures which are coated with an electrically conductive metal layer and then galvanically reinforced. The first metal layer can be applied by means of a wet-chemical, current-less process or by vapor deposition. The result obtained is a metallized, textile surface structure with still textile properties. Gluing of the mesh intersections is undesirable.

In consideration of that state of the art, the inventor set himself the aim of so improving the process as set forth in the opening part of this specification that, while avoiding the known disadvantages, operationally reliable cloth webs are produced inexpensively, in particular for use in screen printing, under a high loading they result in a substantially lesser degree of stretch in comparison with the state of the art, and they can no longer be displaced or deformed. The invention seeks to provide that expensive metal cloths can be replaced by metallized plastic cloths of corresponding properties.

That object is attained by the teachings of the independent claims; the appendant claims set forth advantageous developments.

In accordance with the invention a plastic cloth is prepared from both sides thereof in a multiple procedure by vapor deposition or so-called sputtering—using cathodic atomisation—for the galvanization operation, that is to say it is provided with a metallic casing layer of a surface resistance of 0.2 ohm/2 to 200 ohm/2 and is then galvanically coated.

Finally, such a preparation procedure by means of vacuum plasma spraying is also in accordance with the invention.

In accordance with the invention all vapor deposition materials can be freely selected and are to be matched to the subsequent galvanization procedure. However nickel in particular is preferred because of its chemical resistance; other substances which are advantageously used here are gold, silver, copper, steel or a light metal—in particular aluminum—alone or as an alloy.

The vapor deposition, sputtering process or spray process is to be implemented on both sides, and it can also be repeated a plurality of times. In that respect, layer thicknesses of about 5 to over 200 nanometers—in particular over 50 nm—, are produced.

Electrical conductivity of the cloth is afforded by the dry process step of vapor deposition, cathode sputtering as mentioned above or vacuum plasma spraying.

The mechanical properties of the metallized cloth are primarily determined by the galvanization operation; stretching is strikingly reduced, with an increased level of strength of the cloth, and—irrespective of the nature of the initial cloths—the resistance to slip of the cloth is increased to an extraordinary degree. The metallizing substances contribute in particular to the strength at the bonding locations of the cloth of plastic base materials and form a conductive surface. It thus becomes possible to replace expensive metallic cloths by metallized plastic cloths with similar properties.

Therefore, the basis used for the screen printing form which is produced in a finished condition and which is provided with a coating is a metallized plastic cloth, preferably with a metal coating of nickel because of its general strength. The metallic surface of the screen printing plate reduces the wear of the stencil, whereby it is possible to achieve very high numbers of print copies with the latter.

The conductive surface of the screen printing plate prevents static charging phenomena. Limitations in regard to materials to be printed or inks, due to problems with static, can be practically eliminated.

The metallized plastic cloth according to the invention guarantees very minimal stretch phenomena with an adequate level of basic strength and provides that there are scarcely measurable register differences on the stencil, irrespective of the set clamping tension.

The fact that the limitedly flexible metallized cloth is coated over its full surface area provides for a high, reproducible stencil quality with excellent edge sharpness and accurate ink metering. A protective foil which is applied if necessary reduces improper manipulation operations which could cause impairment of the quality of coating. As the coating is effected on the endless roll of cloth, there is no need for covering operations, as are the conventional practice at the present time.

To sum up, the advantages achieved are as follows:

- the metal vapor deposition operation, the sputtering operation or the vacuum plasma spraying operation on cloths—in particular plastic cloths—is effected inexpensively and continuously and provides a conductive casing layer as a basis for subsequent galvanic metallization, without the occurrence of by-products or waste products which would have to be removed for disposal thereof;
- without involving specific process adaptation, any plastic base materials can be used for the metal vapor deposition or sputtering procedure, for example polyethyleneterephthalate (PET), polyamide (PA), polyethylene (PE), high performance polyethylene (HPPE), or the like;
- the vapor deposition materials can also be practically freely selected and can thus be adapted for example to a subsequent galvanization procedure;
- the galvanic metal deposition which can be freely determined in regard to its thickness of application can occur directly onto the casing layer;
- the metallized plastic cloths produced in that way have a substantially lower degree of stretching with a higher level of load-bearing capacity and thus afford similar stretch and load-bearing properties to steel mesh; and
- the meshes of the cloth can no longer slide or be deformed, by virtue of the metallization, that is to say tension in a yarn direction does not result in deformation of the cloth—very open-mesh cloths retain their mesh geometry, under a mechanical loading.

The invention admittedly serves in particular for the production of a screen printing stencil, but cloths can also be treated in the described manner for other uses, in particular filter cloths or surface or flat elements for screening or shielding purposes in the electronics sector.

BRIEF DESCRIPTION OF THE DRAWINGS

Further advantages, features and details of the invention will be apparent from the following description of a preferred embodiment and with reference to the diagrammatic drawing in which.

Figure 1:
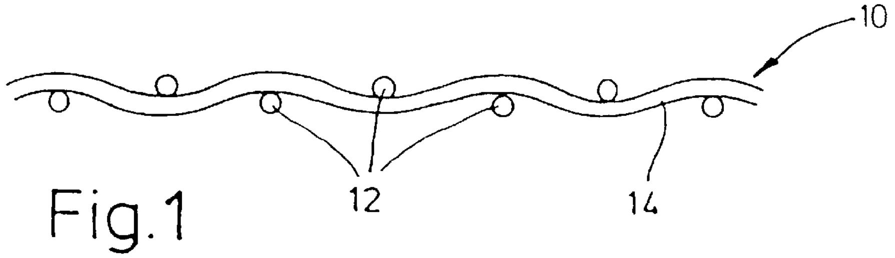
FIG. 1 is a view in cross-section through a cloth.

A cloth 10 for the production of screen printing stencils is produced from mutually crossing warp threads or yarns 12 and weft yarns or threads 14, as shown in FIG. 1 in a so-called linen or basket weave, in which two warp threads 12 and two weft threads 14 belong to a respective repeat—namely, a unit of repetition which is fixed by a given number of bonding locations as indicated at 16. The threads 12, 14 can comprise any plastic base materials, for example polyamide (PA), polyethylene (PE), polyethyleneterephthalate (PET), or the like.

The plastic cloth 10 is subjected continuously, as a roll, to a vapor deposition process, the maximum web length being determined by the largest possible winding diameter in the vapor deposition installation.

The vapor deposition material used is for example gold, silver, copper, nickel, steel, aluminum or the like precious, non-ferrous, heavy or light metals—each alone or in combination—,more specifically, in such a way as to be matched to the subsequent galvanization operation.

Figure 2:
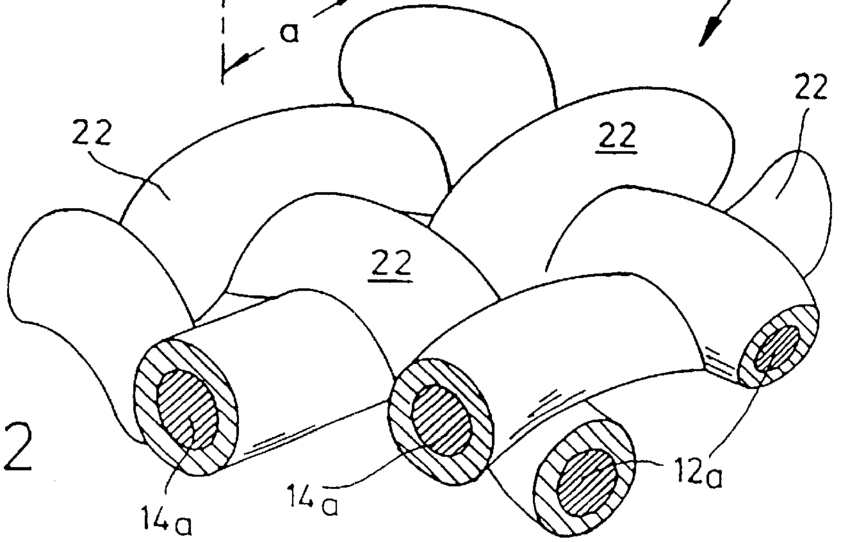
FIG. 2 is a perspective view of an enlarged part of the cloth.

The vapor deposition or sputtering operation—or possibly also vacuum plasma application—is effected on both sides and is possibly repeated a plurality of times, for special requirements. In that operation, a casing layer 18 of a layer thickness b of about 50 to over 200 nm, which is clearly shown in FIG. 3, is produced around the threads 12, 14 each as a respective plastic core—which is identified in FIGS. 2 and 3 by references $\mathbf{12}_a$ and $\mathbf{14}_a$ to distinguish them from the warp and weft threads 12 and 14 respectively for the sake of enhanced clarity of the drawing—of a diameter a of for example 15 $\mu$m to 100 $\mu$m; depending on the type of cloth and the kind of vapor deposition, the casing layers can involve surface resistance values of below 0.5 ohm/2 to over 100 ohm/2.

Figure 3:
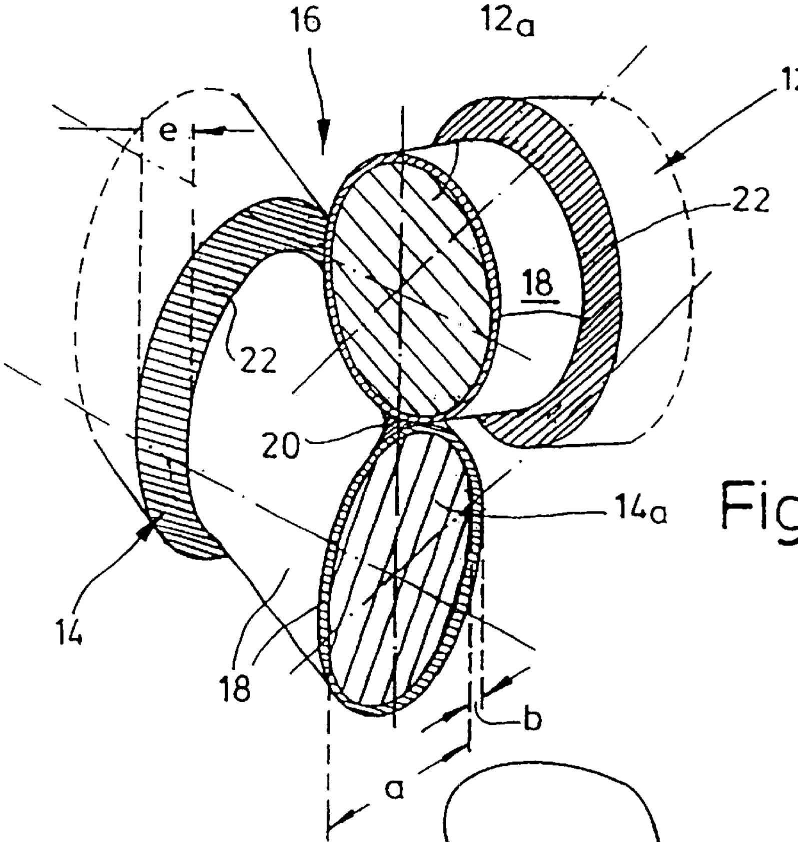
FIG. 3 shows a part of FIG. 2 on an enlarged scale, with a perspective view onto a bonding between two mutually crossing yarns.

That dry coating operation can also result in accumulations of material in the region of each bonding 16, one such bonding being indicated at 20 in FIG. 3 between the mutually crossing threads 12, Direct galvanic metal deposition can now be effected on the plastic cloth which has been prepared by vapor deposition in the above-described manner. In the galvanic application procedure, once again any metals can be used such as for example Cu, Ni or the like.

The vapor deposition material and the vapor deposition thickness are to be matched to the subsequent galvanizing process in order to prevent the casing layer 18 from being reduced by the galvanic bath, whereby the conductivity of the vapor deposition would be reduced or eliminated in the event of prolonged exposure times. Combinations for galvanic metallization are inter alia as follows:

- a Cu-vapor deposition with a surface resistance of about 0.5 to 1 ohm/2 for subsequent galvanic nickel-plating, or
- steel vapor deposition with a surface resistance of about 0.4 ohm/2 to 10 kohm/2 for subsequent galvanic nickel-plating.

The galvanic metallization operation can be implemented as a continuous procedure with practically any roll length and results in a closed metal coating 22 of selectable layer thickness e—of preferably 2 $\mu$m to 20 $\mu$m and more—over the entire cloth 10; that metal coating 22 provides both for a high level of mechanical stability, in particular slip resistance, and also for chemical resistance on the part of the metallized cloth 10; as stated, its strength is considerably increased, with a considerable reduction in stretchability.

What is claimed is:

1. A process for the production of a cloth web, which comprises: providing a plastic cloth of mutually crossing plastic cloth strands with a plurality of metallic casing layers on both sides thereof by means of one of vapor deposition, plasma spraying, or cathode sputtering, so that the metallic casing layers have a surface resistance of about 0.2 ohm/2 to 200 ohm/2 and a thickness of between about 5 and 200 nm; and then galvanically coating the resultant material with a metal coating.

2. A process according to claim 1, including providing said metallic casing layers by said vapor deposition.

3. A process according to claim 1, including providing said metallic casing layers by said cathode sputtering.

4. A process according to claim 1, including providing said metallic casing layers by said plasma spraying.

5. A process according to claim 1, including providing said mutually crossing plastic cloth strands with a metallic casing layer of copper by said vapor deposition, and subsequently galvanically nickel-plating the resultant material, wherein a surface resistance of about 0.5 to 1 ohm/2 is produced in the vapor deposition layer.

6. A process according to claim 1, including providing said mutually crossing plastic cloth strands with a metallic casing layer of steel by said vapor deposition, and subsequently galvanically nickel-plating the resultant material, wherein a surface resistance of about 0.4 ohm/2 to 10 ohm/2 is produced in the vapor deposition layer.

7. A process according to claim 1, wherein said metallic casing layers include at least one of gold, silver, nickel or copper.

8. A process according to claim 7, wherein said at least one of gold, silver, nickel or copper is in the pure form of the metal.

9. A process according to claim 1, wherein the metallic casing layers include at least one of nickel, chromium, steel or aluminum.

10. A process according to claim 1, wherein said metallic casing layers have a thickness of between about 50 nm and 200 nm.

11. A process according to claim 1, including providing said galvanically produced metal coating enclosing the casing layers, with a layer thickness of said galvanically produced metal coating being from about 2 $\mu$m to about 20 $\mu$m.

12. A process according to claim 11, including providing nickel as the galvanically produced metal coating.

13. A process according to claim 1 for the production of a cloth web for use as a screen printing form.

14. A cloth web comprising a plastic cloth of intersecting plastic cloth strands provided with a plurality of metallic casing layers on both sides of said plastic cloth by means of one of vapor deposition, plasma spraying or cathode sputtering, with the metallic casing layers having a surface resistance of about 0.2 ohm/2 to 200 ohm/2 and a thickness between about 5 and 200 nm, wherein said metallic casing layers are in turn covered with a galvanically coated metal coating.

15. A cloth according to claim 14, wherein the metallic casing layers contain at least one of gold, silver, nickel, copper, chromium, steel or light metal.

16. A cloth according to claim 14, wherein the thickness of the metallic casing layers are between about 50 and 200 nm.

17. A cloth according to claim 14, wherein the galvanically coated metal coating on the metallic casing layers have a thickness of between about 2 $\mu$m and 20 $\mu$m.

18. A cloth according to claim 14 for use as a screen printing form.

19. A cloth according to claim 14 for use as a filter cloth.

20. A cloth according to claim 14 for use for shielding purposes in an electronic sector.

* * * * *